J. BLAKE.
EXTENSION AUGER.
No. 27,946.
Patented Apr. 17, 1860
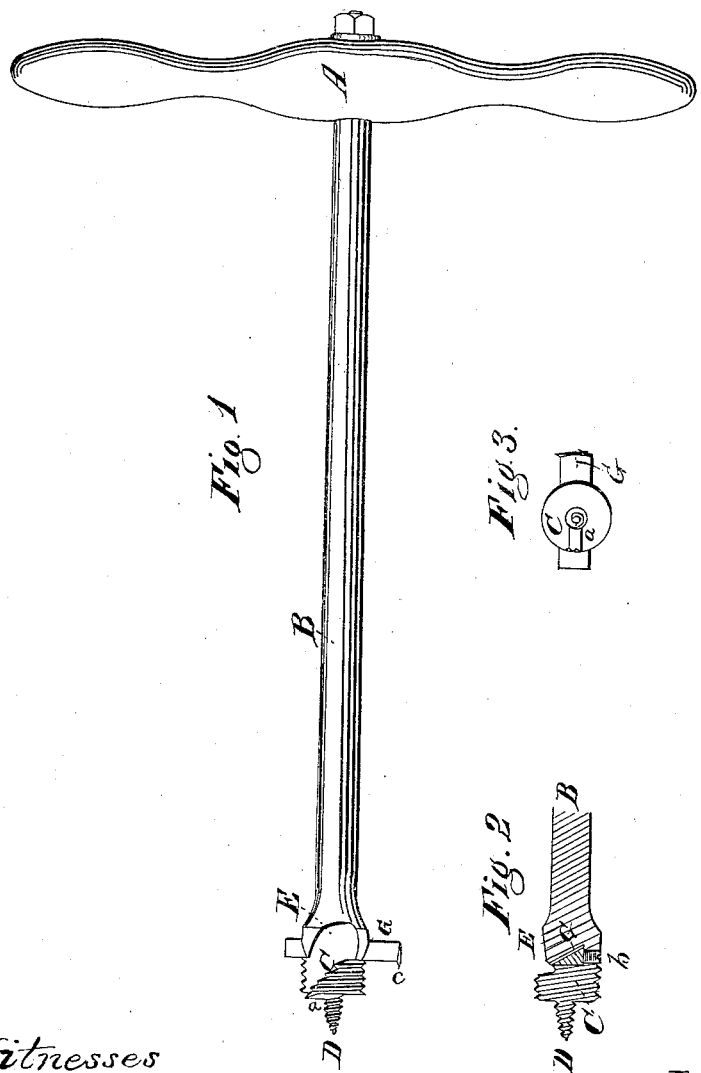

UNITED STATES PATENT OFFICE.

JAS. BLAKE, OF EAST PEPPERELL, MASSACHUSETTS, ASSIGNOR TO HIMSELF AND HENRY BLAKE, OF SAME PLACE.

AUGER.

Specification of Letters Patent No. 27,946, dated April 17, 1860.

*To all whom it may concern:*

Be it known that I, JAMES BLAKE, of East Pepperell, in the county of Middlesex and State of Massachusetts, have invented a new and Improved Extension-Auger; and I do hereby declare that the following is a full, clear, and exact description of the same, reference being had to the accompanying drawings, forming part of this specification, in which—

Figure 1, represents a view of the auger complete, showing the adjustable cutter driving screw and center screw point. Fig. 2, a longitudinal view of the end of the auger, and a portion of its shank, showing the screw for setting the adjustable cutter for any desired hole to be cut. Fig. 3, an end view of the end of the auger.

Similar letters of reference indicate corresponding parts in the three figures.

This invention and improvement in augers consists in forming on the end of the auger-shank or stem an enlarged cylindrical portion, having a suitable screw thread cut on it, and a short spiral groove terminating in a radial cutting point on the end of the auger, and a conical screw point which serves to center and start the auger, while the cutter on the end of the cylindrical screw portion serves to cut a hole corresponding in diameter to the enlargement, through which enlargement passes an adjustable cutter which immediately succeeds the screw on the enlargement and forms a hole, in size according to the distance, the cutting end is set from the axis of motion, as will be hereinafter described and represented.

The object of this invention is to combine with the adjustable expansion cutting bar, a suitable device for steadying this cutter and for drawing it down to the work in all kinds of work either with the grain of wood or antagonistic to it, and at the same time causing the cutter to make a smooth cut, and a true hole as will be hereinafter shown.

To enable those skilled in the art to fully understand my invention, I will proceed to describe its construction and operation.

In the drawings, Fig. 1, A, represents the usual T handle, secured to the stem or shank B, which is of any suitable length, and has formed on its end a cylindrical and slightly conical enlargement C, with a screw thread cut on it as shown by the drawings, and from the center of the end of this enlargement, projects a conical centering screw point D. E is a groove and discharging throat for a radial cutting edge *a*, on the end of the enlargement C, which cutter opens a way for the enlargement as the tool is driven into the work, the chips passing freely up through the throat E, above the enlargement.

A triangular hole is formed transversely through the enlarged portion C, just above the screw thread, through which portion is passed a cutter bar G, corresponding in shape to the hole through which it passes, as shown by Figs. 1 and 2 of the drawings. This cutting bar passes loosely through the enlargement and it can be adjusted to its fullest extent, and fixed by a set screw *b*, Fig. 2. It has two cutting edges, one a straight edge at right angles to the axis of the auger, and the other *c*, an edge at right angles to the straight edge which describes the circle, the diameter of the hole to be cut, and cuts down the side of the hole, the distance of the width of the chip to be cut by the straight edge. The greater the distance this last cutting point *c*, is from the axis of the auger, the greater will be the diameter of the hole cut. This cutter bar then virtually cuts the hole, while the screw ends precede the cutter bar, and serve to guide the auger straight to the work. The screw thread on the enlargement C, between the point D, and the cutter bar G is claimed to be important, not only for keeping the auger point true in all kinds of work, but where a cutting bar like G, is employed, it is necessary to have a firm and steady hold, and at the same time a downward drawing action, or else this cutter will not operate at all. The screw thread on the enlargement will hold the parts firmly and steadily and when once started into the work, a straight and smooth hole will be the result. There will be less pressure required on the auger, for when the screw on the enlargement takes hold, it will feed the cutter G, down to the work with a speed proportioned to the distance of the threads apart.

Having thus described my invention, what I claim as new and desire to secure by Letters Patent is,

The combination, with extensible cutter bar G of the screw enlargement C, with or without the center point D, the same being arranged as and for the purposes herein set forth.

JAMES BLAKE.

Witnesses:
L. W. BLAKE,
SUMNER CARTER.